United States Patent [19]

Dechavanne

[11] Patent Number: 4,484,512
[45] Date of Patent: Nov. 27, 1984

[54] SEAL, SCRAPER, AND GUIDE FOR DOUBLE-ACTING PISTON

[76] Inventor: Jacques Dechavanne, 9, chemin du Gua, Sassenage (Isere), France

[21] Appl. No.: 301,032

[22] Filed: Sep. 10, 1981

[51] Int. Cl.³ .................... F16J 15/32; F16J 15/24
[52] U.S. Cl. .................................. 92/243; 277/24; 277/152; 277/165; 92/244; 92/249
[58] Field of Search ............... 277/24, 152, 153, 165; 92/240, 242, 243, 244, 249

[56] References Cited

U.S. PATENT DOCUMENTS

| | | | |
|---|---|---|---|
| 3,774,920 | 11/1973 | Sievenpiper | 277/165 |
| 3,920,252 | 11/1975 | Dechavanne | 277/165 |
| 3,980,309 | 9/1976 | Dechavanne | 277/165 |
| 3,990,712 | 11/1976 | Dechavanne | 277/165 |
| 4,067,584 | 1/1978 | Hunger | 277/24 |
| 4,294,164 | 10/1981 | Stoll | 92/243 |
| 4,337,956 | 7/1982 | Hopper | 277/152 |

*Primary Examiner*—Richard E. Schafer
*Assistant Examiner*—Richard L. Klein
*Attorney, Agent, or Firm*—Karl F. Ross

[57] ABSTRACT

A double-acting piston and cylinder assembly has a piston which in turn has an outer piston surface centered on an axis, a radially outwardly open piston groove and a pair of axially oppositely facing piston ends. The cylinder has an inner surface centered on the axis and spaced radially outside the outer piston surface. A tubularly annular element received in the piston groove has an outer surface centered on the axis and bearing radially outwardly on the cylinder so the piston is guided in the cylinder by the outer element surface. The annular element has an element groove open radially inwardly to the piston between the end element surfaces and having a pair of axially spaced element-groove flanks, a pair of seal lips axially level with the element groove and having juxtaposed seal-lip ends lying when unstressed radially outside the outer element surface but normally bearing against the cylinder surface, and radially inner web surfaces exposed in the element groove, and respective end scraper lips having respective outer scraper-lip ends extending axially beyond the piston ends and lying when unstressed radially outside the outer element surface but normally bearing radially outward on the cylinder surface. The assembly also has an elastomeric ring in the element groove bearing radially inward on the piston and radially outward on the inner lip surfaces. Thus the ring urges the webs elastically outward against the cylinder surface.

10 Claims, 6 Drawing Figures

SEAL, SCRAPER, AND GUIDE FOR DOUBLE-ACTING PISTON

FIELD OF THE INVENTION

The present invention relates to a double-acting piston and cylinder assembly. More particularly this invention concerns a seal, scraper, and guide for a double-acting piston.

BACKGROUND OF THE INVENTION

A piston normally has a cylindrical outer surface that is perfectly complementary and coaxial with the cylindrical inner surface of a cylinder in which the piston moves axially, with or without rotation of the piston about the axis. Obviously it is essential that no fluid flow be possible around the piston, that is axially between the piston outer surface and cylinder inner surface. Furthermore it is always essential that the piston remain perfectly square and centered within the cylinder.

To this end the piston is normally provided with a seal that prevents leakage, and with a scraper that prevents particles or the like that have somehow come to adhere to the cylinder wall from coming into contact with the fragile and accurately dimensioned seal. Furthermore either the piston itself is very accurately dimensioned to guide itself in the cylinder, or special guides are provided on the piston to keep it perfectly centered.

A double-acting piston must, of course, be provided with two seals and scrapers. The seals are normally constituted as soft elastomeric glands of U-section with one leg bearing inwardly on the base of the respective piston groove and another leg bearing outwardly on the inner cylinder surface. Such multiplication of parts even further complicates the structure.

The piston must therefore normally be built with a plurality of grooves or steps formed to hold the guides, seals, and scrapers. When no separate guide is provided the piston must be accurately machined to fit precisely in the cylinder bore. Obviously such construction is expensive. Furthermore the labor entailed in servicing any of these wear-prone parts is usually so excessive that the mechanic normally also replaces all of the others while the piston is out.

OBJECTS OF THE INVENTION

It is therefore an object of the present invention to provide an improved piston and cylinder assembly.

Another object is to provide an improved seal, scraper, and guide for a double-acting piston separating two chambers in a cylinder.

A further object is the provision of such an assembly which is relatively easy to service.

SUMMARY OF THE INVENTION

These objects are attained according to the instant invention in a double-acting piston and cylinder assembly whose piston has an outer piston surface centered on an axis, a radially outwardly open piston groove having a piston-groove base lying radially inside the outer piston surface and a pair of piston-groove flanks transverse to the axis, and a pair of axially oppositely facing piston ends. The cylinder has an inner cylinder surface centered on the axis and spaced radially outside the outer piston surface. A tubularly annular element received in the piston groove has an outer element surface centered on the axis and bearing radially outwardly on the cylinder surface. Thus the piston is guided in the cylinder by the outer element surface. In addition the annular element has respective end element surfaces confronting the piston-groove flanks, an element groove open radially inwardly to the piston groove base between the end element surfaces and having a pair of axially spaced element-groove flanks, a pair of seal lips axially level with the element groove and having juxtaposed seal-lip ends lying in the absence of the cylinder radially outside the outer element surface but normally bearing against the cylinder surface, and radially inner web surfaces exposed in the element groove, and respective end scraper lips having respective outer scraper-lip ends extending axially beyond the piston ends and lying in the absence of the cylinder radially outside the outer element surface but normally bearing radially outward on the cylinder surface. The assembly also has an elastomeric ring in the element groove bearing radially inward on the piston groove base and radially outward on the inner lip surfaces. Thus the ring urges the webs elastically outward against the cylinder surface.

The system according to the instant invention therefore is a single subassembly fitted into the piston groove to perform the functions of sealing, scraping, and guiding. The unit is normally stretched to fit over the piston, snapping into place in the piston groove, and is thus simply mounted in place. For repair it is removed, normally by simply cutting it out, and in one simple operation can be replaced with a new subassembly.

The manufacturer of a double-acting ram or the like incorporating the subassembly according to the instant invention need not machine the piston to exact external dimensions, and need merely form it with a single large groove to receive the subassembly, which is normally supplied by a subcontractor. Thus manufacturing costs can be held quite low.

According to another feature of this invention the seal lips have respective webs generally axially level with the element-groove flanks and axially flanking the seal-lip ends. These seal lips are radially substantially thinner at these webs than at the respective seal-lip ends. Thus, unlike the prior-art arrangements, the seal lip gets thicker towards its outer business end. The thin hinge-like web allows it to flex, even when this element is made of relatively hard material. Such use of hard material further avoids the prior-art problem of the seal lip sticking to and gumming up on the cylinder wall. In effect the webs are relatively long and serve to guide the seal lips, not simply to prevent it from getting caught between the piston and cylinder.

According to another feature of the present invention the element is formed between the seal-lip ends with a thin hinge unitarily interconnecting the seal-lips and forming a small radially outwardly open groove therebetween.

The system according to the instant invention therefore compensates for the so-called memory loss or plastic deformation common in virtually any material subject over a long term to some kind of deformation, even within its range of elastic deformation. This plastic deformation is most noticed in the soft elastomeric ring that urges the seal lips out against the cylinder inner wall. Normally in the prior-art systems a single spring ring is provided for urging the seal into contact with the surface to be sealed. Thus the force that largely determines the effectiveness of the seal derives from a single source. According to the instant invention, however, this force has three sources: the elastomeric ring, the hinges or webs of the outer edges of the seal lips of the seal lips, and the hinge interconnecting the seal lips. Obviously this means that the sealing action will be more effective and will be more likely to have a long service life.

It is possible according to this invention for the element to be formed with an outwardly projecting ridge constituting both of said seal-lip ends and radially outwardly engaging the cylinder surface. In such an arrangement there is therefore another element acting as seal, which obviously will give an even better sealing action.

In accordance with another feature of this invention, the seal-lip ends have rounded radially inner corners turned toward each other and engageable with the ring. This prevents the seal lips from biting into and damaging the normally relatively soft ring.

It is also possible according to this invention for the element to be formed of a pair of parts each having one respective end element surface, element-groove flank, seal lip, and scraper lip. In such a system the two parts can be perfectly complementary, so that manufacturing costs are maintained very low. The ring of such an arrangement may have a radially outwardly projecting ridge engaged between the seal-lip ends with the cylinder surface.

The ring according to this invention is normally axially slightly shorter than the element groove. Similarly the element is axially slightly shorter than the piston groove. Such construction makes the element even easier to manufacture, and allows a little lost motion in the piston action to greatly reduce wear.

The element of the assembly according to the invention further has a pair of relatively thin axial extensions having inner extension surfaces engaging the piston surface, outer extension surfaces engaging the cylinder surface, and outer ends carrying the respective scraper lips. These extensions themselves constitute the guide in part, for a long guide surface that effectively prevents the piston from canting in the cylinder bore.

DESCRIPTION OF THE DRAWING

The above and other features and advantages will become more readily apparent from the following, reference being made to the accompanying drawing in which.

SPECIFIC DESCRIPTION

Figure 1:
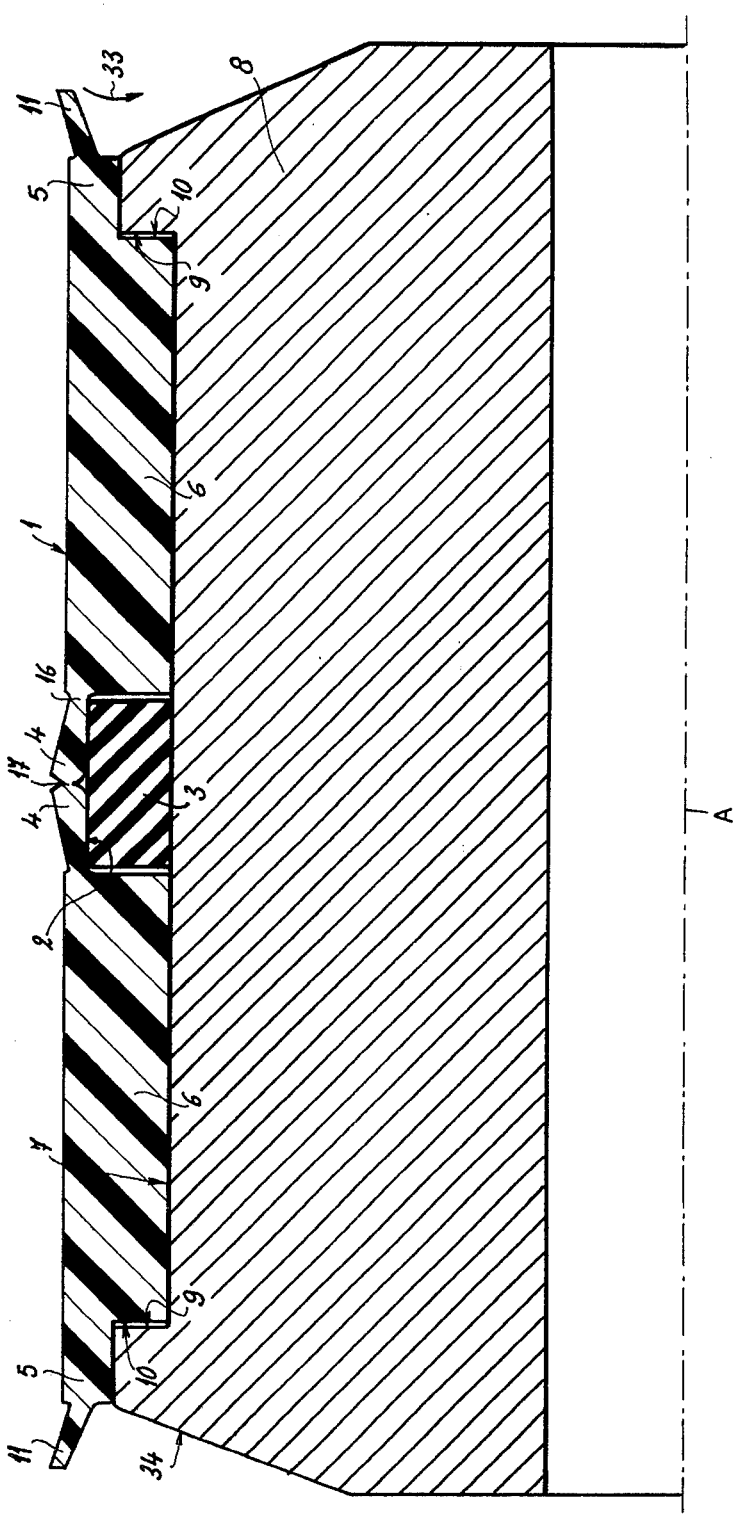
FIG. 1 is an axial section through a piston equipped with the instant invention.

As seen in FIG. 1 a generally tubular element 1 has a pair of relatively thick main portions 6 flanking a rectangular-section groove 2 in which is received an elastomeric rectangular-section elastomeric ring 3, with two seal lips 4 overlying the ring. The outer ends of the main portions 6 are formed with extensions 5.

A double-acting piston 8 is formed with an outwardly open groove having a cylindrical base or floor 7 and a pair of end flanks 9 extending perpendicular to the axis A on which the piston 8 and element 1 are centered. The element 1 has end sufaces 10 which confront but are spaced slightly from the respective surfaces 9. The extensions 5 are formed with scraper lips 11.

Figure 2:
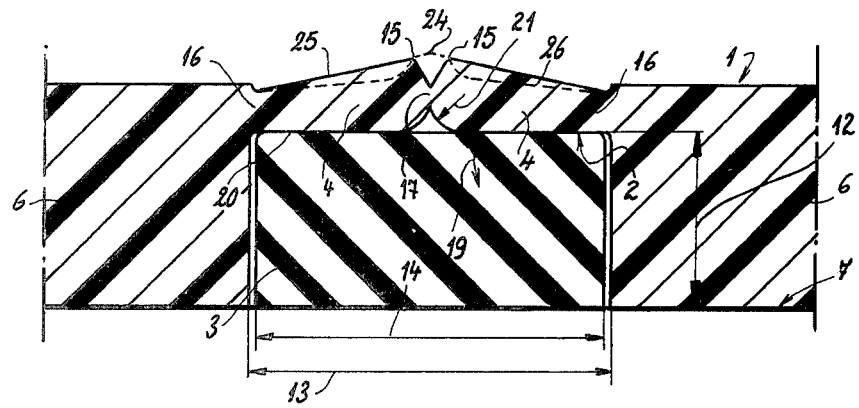
FIG. 2 is a large-scale view of a detail of FIG. 1.

As better seen in FIG. 2 the groove 2 has a depth 12 equal to the radial height of the ring 3 and an axial width 13 which is slightly greater than the corresponding dimension 14 of the ring 3. Thus this ring 3 can move axially limitedly in the groove 2, as the body 1 can move axially in the piston groove 7,9.

The seal lips 4 have outer ends forming sharp edges 15 and are connected to the respective sections 6 by means of webs or hinges 16 which are substantially thinner than the webs at the edges 15. In addition the two lips 4 are connected together at their confronting outer ends by an integral web or hinge 17 which is even thinner than the webs 16.

Figure 3:
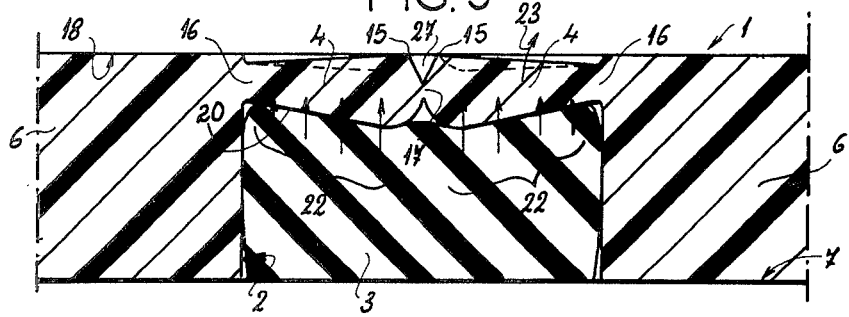
FIG. 3 is a view similar to FIG. 2, but showing the subassembly according to the instant invention installed in a cylinder bore.

FIG. 3 shows how when the assembly is inserted into a cylinder having a cylindrical inner wall 18 centered on the axis A the lips 4 are pressed in as shown by arrow 19 from their FIG. 2 position. This action brings rear or inner surfaces 20 of the lips 4 to bear on the ring 3 and compresses this ring 3 somewhat, bringing to bear on the wall 18 forces 22 which are greater toward the edge 15. The rear surfaces 20 are rounded about radii 21 at their outer ends to prevent the lips 4 from biting into and damaging the ring 3. The forces 22 net to a force 23 which is effective for good sealing action against the cylinder wall 18.

It is possible, as shown in dashed lines in FIG. 2, for the center of the body 1 to be formed with a ridge 24 between the two lips 4. In such a case the normally flat and planar outer surfaces 25 of the lips 4 are made outwardly concave as shown at 26. Otherwise, as indicated in FIG. 3 the two lips 4 form at the hinge a small outwardly open groove 27 which normally is filled with hydraulic liquid to lubricate the assembly and ensure good sealing action.

Figure 4:
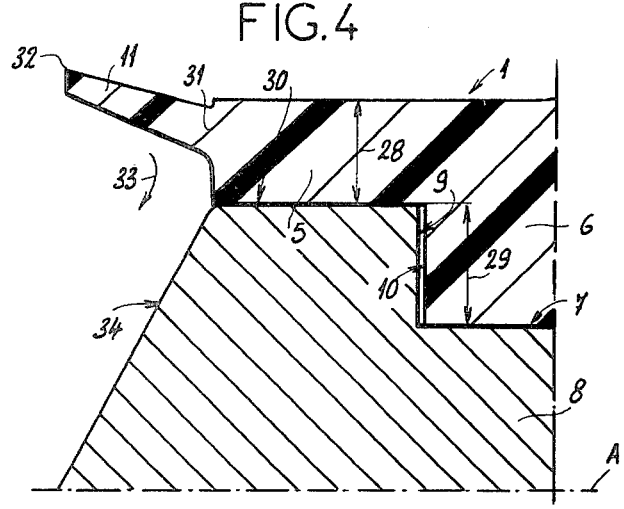
FIG. 4 is a large-scale view of another detail of FIG. 1.

The extension 5 have, as shown in FIG. 4, a radial dimension 28 which is somewhat smaller than the radial height 29 of the surfaces 9 and 10, so that the body 1 is effectively blocked against extrusion out from between the piston 8 and the cylinder wall 18. The inner surface of the body 1, at these extensions 5, lies against the outer piston surface 30 for excellent guiding of the piston 8 on the surface 18.

The lips 11 have sharp outer edges 32 that, like the edges 15 of the lips 4, are in line contact with the wall 18 when the assembly is installed. A relatively thick web or neck 31 is provided for each of these lips 11, so that the inwardly effective force, as shown by arrow 33, will be resisted with a force sufficient to ensure good scraping action at the line/edge 32. Any particles scraped off the wall 18 will therefore by moved radially inward to the outwardly convex frustoconical piston end 34.

Figure 5:
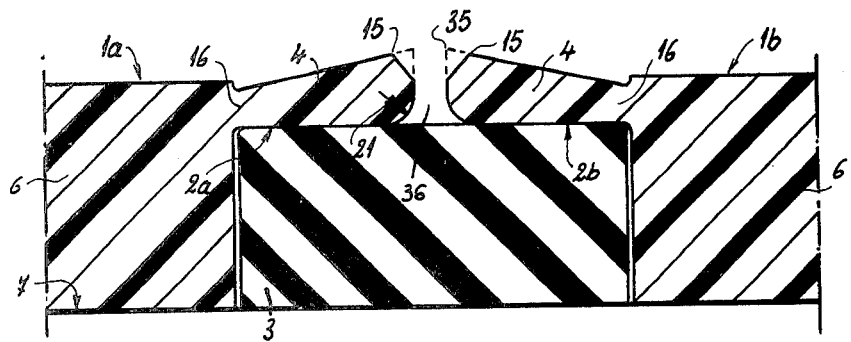
FIGS. 5 and 6 are views similar to FIG. 2 showing further arrangements according to this invention.

It is possible for the body 1 to be formed as seen in FIG. 5 of two parts 1a and 1b, separated by a space 36 between the outer ends of the two lips 4 which therefore form groove halves 2a and 2b in which a single ring 3 is received. The inner ends of the lips 4 may be pointed as indicated at 35.

Figure 6:
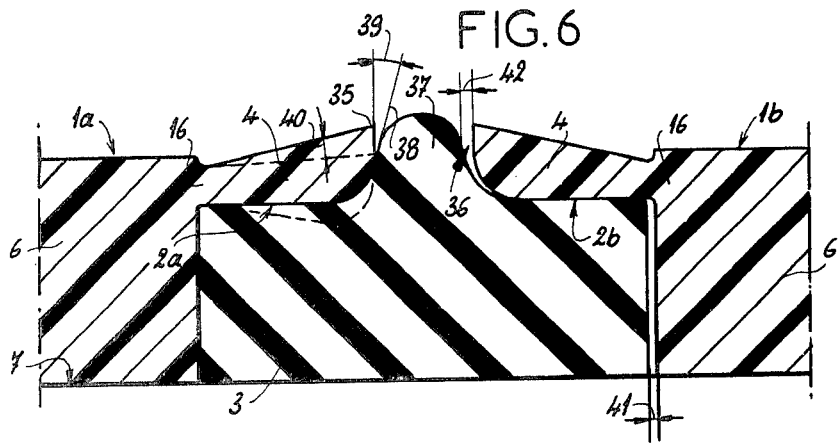

Finally FIG. 6 shows how in such a two-part assembly the ring 3 may be formed with an outwardly projecting ridge 37 that extends out through the gap 36 so that it can contact the cylinder wall 18 when installed. This ridge 37 has a flank angle 39 formed with a perpendicular to the axis A, which is also parallel to the lip end in the unassembled position, that is such that when the lip 4 is depressed inwardly when assembled, as shown by the equal angle 40, the lip 4 will not bite into and damage the ring 3. This ring 3 is also shorter than the groove 2a, 2b by a distance 41 that is equal to a gap 42 left between the ridge 37 and the gap 36. Thus the ring 3 can shift slightly axially without damage. It has been proven that a small degree of lost motion greatly increases the service life of such an arrangement.

The system according to the instant invention therefore incorporates the functions of sealing, guiding, and scraping in a single unit that is fitted to the piston by being stretched over it and snapped in place in the piston groove. The arrangement can be produced by a manufacturer specializing in seals and the like and can be installed by even a relatively unskilled mechanic.

I claim:

1. A double-acting piston and cylinder assembly comprising:
    a piston having
        an outer piston surface centered on an axis, a radially outwardly open piston groove having a piston-groove base lying radially inside said outer piston surface and a pair of piston-groove flanks transverse to said axis, and
        a pair of axially oppositely facing piston ends;
    a cylinder having an inner cylinder surface centered on said axis and spaced radially outside said outer piston surface;
    a tubularly annular element received in said piston groove and having
        an outer element surface centered on said axis and bearing radially outward on said cylinder surface, whereby said piston is guided in said cylinder by said outer element surface,
        respective end element surfaces confronting said piston-groove flanks,
        an element groove open radially inward to said piston groove base between said end element surfaces and having a pair of axially spaced element-groove flanks,
        a pair of seal lips axially level with said element groove and having justaposed seal-lip ends lying in the absence of said cylinder radially outside of said outer element surface but normally bearing against said cylinder surface, radially inner seal-lip surfaces exposed in said element groove, and respective webs generally axially level with said element-groove flanks and axially flanking said seal-lip ends, said seal lips being radially substantially thinner at said webs than at the respective seal-lip ends, said element being formed with an outwardly projecting ridge constituting both of said seal-lip ends and radially outwardly engaging said cylinder surface, and
        respective end scraper lips having respective outer scraper-lip ends extending axially beyond said piston ends and lying in the absence of said cylinder radially outside said outer element surface but normally bearing radially outward on said cylinder surface; and
    an elastomeric ring in said element groove bearing radially inward on said piston groove base and radially outward on said seal-lip surfaces, whereby said ring urges said lips elastically outward against said cylinder surface.

2. A double-acting piston and cylinder assembly comprising:
    a piston having
        an outer piston surface centered on an axis,
        a radially outwardly open piston groove having a piston-groove base lying radially inside said outer piston surface and a pair of piston-groove flanks transverse to said axis, and
        a pair of axially oppositely facing piston ends;
    a cylinder having an inner cylinder surface centered on said axis and spaced radially outside said outer piston surface;
    a tubularly annular element received in said piston groove and having
        an outer element surface centered on said axis and bearing radially outward on said cylinder surface, whereby said piston is guided in said cylinder by said outer element surface,
        respective end element surfaces confronting said piston-groove flanks,
        an element groove open radially inward to said piston groove base between said end element surfaces and having a pair of axially spaced element-groove flanks,
        a pair of seal lips axially level with said element groove and having juxtaposed seal-lip ends lying in the absence of said cylinder radially outside of said outer element surface but normally bearing against said cylinder surface, radially inner seal-lip surfaces exposed in said element groove, and respective webs generally axially level with said element-groove flanks and axially flanking said seal-lip ends, said seal lips being radially substantially thinner at said webs than at the respective seal-lip ends, said element being formed between said seal-lip ends with a thin hinge unitarily interconnecting said seal lips and forming a small radially outwardly open groove therebetween, and
        respective end scraper lips having respective outer scraper-lip ends extending axially beyond said piston ends and lying in the absence of said cylinder radially outside said outer element surface but normally bearing radially outward on said cylinder surface; and
    an elastomeric ring in said element groove bearing radially inward on said piston groove base and radially outward on said seal-lip surfaces, whereby said ring urges said lips elastically outward against said cylinder surface.

3. The assembly defined in claim 2 wherein said seal lips have respective webs generally axially level with said element-groove flanks and axially flanking said seal-lip ends.

4. The assembly defined in claim 3 wherein said seal lips are radially substantially thinner at said webs than at the respective seal-lip ends.

5. The assembly defined in claim 2 wherein said seal lips have respective radially outwardly concave outer surfaces.

6. The assembly defined in claim 2 wherein said seal-lip ends have rounded radially inner corners turned toward each other and engageable with said ring.

7. The assembly defined in claim 2 wherein said ring is axially slightly shorter than said element groove.

8. The assembly defined in claim 2 wherein said element is axially slightly shorter than said piston groove.

9. The assembly defined in claim 2 wherein said element further has a pair of relatively thin axial extensions having inner extension surfaces engaging said piston surface, outer extension surfaces engaging said cylinder surface, and outer ends carrying the respective scraper lips.

10. The assembly defined in claim 2 wherein said scraper lips taper axially away from each other.

* * * * *